Patented July 7, 1936

2,046,795

UNITED STATES PATENT OFFICE 2,046,795

PROCESS FOR MAKING COMPOUNDS CONTAINING HEAVY METALS AND SULPHHYDRYL GROUPS FROM KERATINATES

Ernst Sturm, Berlin-Lankwitz, and Richard Fleischmann, Berlin - Charlottenburg, Germany, assignors to Chemische Fabrik Johann A. Wulfing, Berlin, Germany No Drawing. Application March 31, 1933, Serial No. 663,869. In Germany April 5, 1932

5 Claims. (Cl. 260—9)

The object of this invention is a process for making compounds containing heavy metals and sulphhydryl groups from keratinates. It is known to make compounds containing sulphhydryl groups from keratins by hydrolyzing the keratins with acids and then treating them with tin and hydrochloric acid. In this process a mixture of albumose-like degradation products containing sulphhydryl groups is obtained.

According to the present invention substantially single heavy metal compounds are obtained by hydrolyzing starting materials which contain keratin by means of acid until the starting substances have lost their natural form and become converted into a gelatinous mass, and then effecting a reduction with zinc.

Zinc compounds are first of all made from the reduced hydrolysis liquid by neutralizing the filtrate until it shows only a weakly acid reaction (approximately pH=6.5), filtering off the precipitate which forms, washing it and drying it, if necessary in a vacuum.

If the reduction were carried out with tin and the acid solution neutralized then a precipitate would be obtained it is true, but this precipitate could not be satisfactorily washed nor separated in the pure state. Thanks to the difficult solubility of the zinc sulphhydryl compounds these can be separated from the mixture directly in the pure state.

Instead of starting out with substances containing keratin it is also possible to start with the keratinates obtained in accordance with U. S. Patent No. 1,921,398. These keratinates are treated in acid solution with zinc and after the reduction the filtered hydrolysis liquid is neutralized again until it shows only a weakly acid reaction, (approximately pH=6.5). The white zinc compounds separating out are further treated as above described.

The zinc compounds form a whitish granular product which can be filtered and washed at the pump and on analysis disclose a zinc content of 12–14%, and the very substantial sulphur content of about 6.5–7.2% with a nitrogen content of 12%. They are soluble in alkalies and acids.

Compounds of other heavy metals can be obtained from the water-insoluble zinc compound by first decomposing the latter with hydrogen sulphide, evaporating the filtrate in a vacuum and then treating in aqueous solution the sulphhydryl keratinic acid thus obtained with compounds of various heavy metals. The compound containing free sulphhydryl groups obtained from the zinc compond by decomposition with hydrogen sulphide is an acid and contains about 7.6–8.2% sulphur with a nitrogen content of 13–14%.

On addition of gold, silver and mercury salts to the aqueous solution of the sulphhydryl keratinic acid at first no insoluble compounds are formed. By means of spot tests it can be shown that the sodium nitroprusside reaction of the sulphhydryl groups becomes fainter and fainter in proportion to the extent in which the corresponding metal salts are added until finally it ceases altogether. All the sulphhydryl groups are then occupied or oxidized by the heavy metal. If further quantities of the said heavy metal salts are added after this point has been reached then in every case precipitates are obtained which in the case of silver redissolve on addition of a further excess of the silver salt.

The compounds can be precipitated by addition of organic precipitants from the solutions which show no sodium nitroprusside reaction or only a very weak one.

In the production of the copper compound the end point of the reaction can be ascertained only approximately by drop tests with sodium nitroprusside, since the colour reaction of the copper impairs the sodium nitroprusside reaction. The end of the reaction may be ascertained by the fact that after addition of copper salt, on shaking, the practically black colour which first appears vanishes and a brownish yellow colour is produced.

According to the present invention metal compounds can be made in which the sulphhydryl reaction in an alkaline medium is not completely repressed by first of all ascertaining the combining capabilities of the sulphhydryl keratinic acid by titration with silver nitrate until the sodium nitroprusside reaction vanishes and then adding to the aqueous solutions of the sulphhydryl keratinic acids quantities of metal salt which are equivalent to the silver used. If water-soluble lead salt is added in a quantity corresponding to the silver used then the solution turns yellow, becomes turbid, and a slight precipitation takes place. Complete precipitation of the lead compound formed can be produced by adding ethyl alcohol.

Similarly metal compounds can be made with tervalent arsenic, antimony, and bismuth salts or with pentavalent arsenic and antimony salts. In the reaction 1 molecule of silver corresponds to one-third of a molecule of the tervalent salt and one-fifth of a molecule of the pentavalent salt. In order to separate the compounds the solutions, which may be weakly acid, neutral or weakly alkaline, are precipitated with organic agents.

If, in the production of the gold salt, sulphurous acid is introduced into the solution of sulphhydryl keratinic acid, then insoluble products are precipitated and the sulphhydryl reaction vanishes only when 2 or 3 times the quantity of gold has been added. By precipitation with organic agents a gold compound is obtained containing on an average 27–30% gold.

According to the present invention compounds of sulphhydryl keratinic acid may also be obtained with those organic arsenic and antimony compounds which contain the heavy metal partially bound to carbon. In this case one molecule of silver salt is equivalent to a quarter of a molecule of a pentavalent, and one-half of a molecule of a tervalent organic arsenic or antimony compound.

If in the production of the heavy metal compounds soda lye is added prior to the precipitation with organic agents until the liquid shows a weak alkaline reaction, and after that precipitation effected with an organic agent, then the sodium salts of the heavy metal compounds are obtained. These sodium salts are readily soluble in water.

By adding water-soluble bismuth compounds to the aqueous solution of sulphhydryl keratinic acid compounds are separated out which are difficultly soluble in water and which can be forthwith separated off. The bismuth compounds obtained in this way contain up to 34% of bismuth.

The heavy metal compounds are to be used for therapeutic purposes.

Example 1

100 parts by weight of hair are heated with 400 parts by weight of 20% hydrochloric acid on the water bath until the hair loses its natural form and is converted to a gelatinous mass. 20 parts by weight of zinc powder are now introduced in small portions into the hydrolysate whilst stirring. After the reduction is complete the hydrolysate is filtered and the clear filtrate neutralized with 33% soda lye until it shows only a weak acid reaction (approximately pH=6.5).

The white product which separates out as a result is filtered off at the pump, washed with water at the pump until no turbidity is formed in the washing water after addition of ammonium sulphide and then dried in a vacuum.

Example 2

60 parts by weight of the keratinate obtained by the process described in U. S. Patent No. 1,921,398 are dissolved in 300 parts by weight of 20% hydrochloric acid. 12 parts by weight of zinc powder are introduced into the solution in small quantities whilst stirring. After the reduction has taken place the whole is filtered and the solution neutralized with 33% soda lye until it shows only a weak acid reaction (approximately pH=6.5).

The white product which separates out as a result is filtered off at the pump, washed with water at the pump until no turbidity is formed in the washing water after addition of ammonium sulphide, and then dried in a vacuum.

Example 3

The zinc compound obtained according to Example 1 or 2 is suspended in a 10-fold quantity of water and hydrogen sulphide is introduced. After complete decomposition the zinc sulphide is filtered off and the filtrate evaporated to dryness in a vacuum.

Nine parts by weight of the sulphhydryl keratinic acid obtained in this way are dissolved in 70 parts by weight of water and a solution of 2.7 parts by weight of sodium aurichloride in 15 parts by weight of water are introduced into this solution in small quantities whilst stirring. A yellow coloured product separates out which, however, forthwith goes up into solution again on stirring. Finally the solution assumes a gold-brown colour and yields no sodium nitroprusside reaction or only a very weak one. It can be used forthwith for therapeutic purposes after neutralizing the acid with 5 parts by volume of 4.4% soda lye. The gold content of the solution is 0.9%.

Example 4

Five parts by weight of sulphhydryl keratinic acid are dissolved in 25 parts by weight of water and 20% silver nitrate solution is added to the solution whilst stirring until a drop of the mixture together with a drop of ammonia and a drop of sodium nitroprusside solution no longer yields a violet coloration on addition of common salt. After adding 5 parts by volume of the silver nitrate solution the sodium nitroprusside reaction becomes a negative one. On mixing the solutions a precipitate forms first of all but it rapidly disappears. A product is precipitated from the solution by adding a 4-fold quantity of alcohol which, filtered at the pump, washed with alcohol and dried in a vacuum, contains 16–17% of silver. It is readily soluble in water; the yellow coloured solution reacts slightly acidic.

Example 5

Four parts by weight of sulphhydryl keratinic acid are dissolved in 20 parts by weight of water and a 20% mercury acetate solution is added in small quantities whilst stirring until a drop of the solution with a drop of ammonia and a drop of 4% sodium nitroprusside solution no longer shows any violet coloration on addition of sodium chloride. When the solutions are mixed a precipitate forms first of all but this soon goes up into solution again. The filtered brown-yellow solution is mixed with a 4-fold quantity of alcohol. The precipitated greyish-yellow product is filtered at the pump, washed with alcohol and dried in a vacuum at ordinary temperature. It contains on an average 14% of mercury.

Example 6

A 5% copper acetate solution is added in small quantities to a solution of 4 parts by weight of sulphhydryl keratinic acid in 20 parts by weight of water. First of all a black coloration is formed which, however, soon disappears again. After addition of 8 parts by volume of the copper acetate solution the reaction is complete and the solution is of a brownish-yellow color. The copper compound is precipitated by addition of 100 parts by weight of alcohol, the somewhat slimy product is filtered off, washed with alcohol and dried in a vacuum. The greyish yellow colored product contains on an average 6% of copper; it is not completely soluble in water. The brownish-colored solution reacts slightly acidic. On standing in the air it turns to an olive brown color and a grey precipitate separates out.

Example 7

The sulphhydryl keratinic acid is first of all titrated with silver nitrate solution until the sodium nitroprusside reaction vanishes. One gram of sulphhydryl keratinic acid in 20% aqueous solution uses up 0.2 g. of silver nitrate, which is equivalent to 0.12 g. of silver.

Five parts by weight of sulphhydryl keratinic acid are dissolved in 25 parts by weight of water. 1.1 parts by weight of lead acetate (the quantity corresponding to the silver used) dissolved in 6.25 parts by weight of water are added to this solution. The solution is colored yellow as a result, becomes turbid and finally yields only a very weak sodium nitroprusside reaction. The 4-fold quantity of alcohol is added and the precipitated bright product filtered off at the pump, washed with alcohol, and dried in a vacuum. The compound contains on an average 17% of lead; it is only partially soluble in water but becomes completely soluble on addition of ammonia or sodium carbonate.

Example 8

Ten parts by weight of sulphhydryl keratinic acid are dissolved in 50 parts of water and 0.51 part of sodium arsenite (a quantity corresponding to the silver used) dissolved in 6 parts of water are added to the solution. The sodium nitroprusside reaction of the solution is still strongly positive when ammonia is added. The clear weakly acid solution is stirred into the 4-fold quantity of methyl alcohol. A pure white product is precipitated out which is filtered off at the pump, washed with methyl alcohol and dried in a vacuum. It dissolves in water, but not quite completely, giving a weakly acid reaction; complete solution is brought about only by adding ammonia, soda lye, soda carbonate or soda bicarbonate. The solutions are yellow coloured and, with the exception of the bicarbonate solution, still show a positive sodium nitroprusside reaction.

Example 9

Ten parts by weight of sulphhydryl keratinic acid are dissolved in 50 parts of water. A solution of 0.6 part of potassium pyroantimoniate (which is equivalent to the silver used) in 12 parts of water is stirred into the solution. A turbidity and precipitation is produced which, after addition of 10% potash lye until the reaction is slightly alkaline, go up into solution again. The clear solution which shows a positive sodium nitroprusside reaction is introduced into the 6-fold quantity of methyl alcohol whilst stirring. The compound is precipitated out in the form of a solid white product which is washed with methyl alcohol. It is incompletely soluble in water and becomes completely soluble only after adding potash lye or potassium carbonate. Ammonia, sodium carbonate and sodium bicarbonate also yield clear solutions. The bicarbonate solution does not show any sodium nitroprusside reaction.

Example 10

Ten parts by weight of sulphhydryl keratinic acid are dissolved in 50 parts of water, 1.964 parts of potassium antimonyl tartrate (a quantity corresponding to the silver used) dissolved in 36 parts of water are added to the solution. The clear weakly acid solution yields a strong sodium nitroprusside reaction with ammonia. It is stirred into 350 parts of methyl alcohol, when a solid white product precipitates out which is not quite completely soluble in water but enters solution with alkalies. The bicarbonate solution shows only a very weak sodium nitroprusside reaction.

Example 11

Ten parts by weight of sulphhydryl keratinic acid are dissolved in 50 parts of water after which a solution of 2 parts by weight of bismuth ammonium citrate (the quantity of bismuth equivalent to 1.2 g. of silver) in 10 parts of water are added to the mixture whilst stirring. A precipitation takes place and the sodium nitroprusside reaction of the reaction mixture becomes weaker. On adding concentrated soda lye until a weak alkaline reaction is obtained the yellowish precipitate re-enters solution. The clear brownish-yellow solution is stirred into the 10-fold quantity of ethyl alcohol. A greyish yellow somewhat slimy product precipitates out which becomes solid on washing with alcohol. The product dried in a vacuum contains on an average 9% of bismuth and is readily soluble in water with neutral reaction and yellow color.

Example 12

Four parts by weight of sulphhydryl keratinic acid are dissolved in 15 parts by weight of water and sulphur dioxide is introduced into the solution until the latter is saturated with the gas. A solution of 2 parts by weight of gold trichloride in 5 parts by weight of water are added in small quantities to the mixture whilst stirring. At the end of the reaction the sodium nitroprusside reaction is still slightly positive. The whole is filtered and the gold compound precipitated out by adding a 6-fold quantity of alcohol. The white product is filtered off at the pump, washed with alcohol and dried in a vacuum. It contains 27 to 30% of gold, is readily soluble in water and has an acid reaction. A 10% solution gradually becomes gelatinous on keeping.

Example 13

Ten parts by weight of sulphhydryl keratinic acid are dissolved in 50 parts of water. To the solution is added 0.76 part of p-acetylaminophenylarsonic acid (a quantity corresponding to the silver used). After the acetarsanilic acid has entered solution at ordinary temperature the weakly acid solution is stirred into the 4-fold quantity of methyl alcohol. A solid yellowish product precipitates out which is only partially soluble in water. On adding ammonia, sodium carbonate, or sodium bicarbonate, it goes up into solution with production of a yellow color; the bicarbonate solution shows no sodium nitroprusside reaction.

Example 14

Ten parts by weight of sulphhydryl keratinic acid are dissolved in 50 parts of water. 1.4 parts by weight of p-acetylaminophenylarsine oxide (a quantity corresponding to the silver used) are added after which the reaction mixture is gently heated. After a short time the p-acetylaminophenylarsine oxide which is difficulty soluble in water goes up into solution. The cooled clear weakly acid solution is then stirred into the 4-fold quantity of methyl alcohol, whereupon the compound is precipitated as a white product which is only incompletely soluble in water and which dissolves in alkalies with production of a yellow color. The bicarbonate solution yields no sodium nitroprusside reaction.

Example 15

Ten parts by weight of sulphhydryl keratinic acid are dissolved in a 5-fold quantity of water and 17% gold trichloride solution is stirred into the mixture until the sodium nitroprusside reaction is only very slightly positive or even negative. About 10 cc. of the 17% gold trichloride solution have then been used. The reaction mixture is now treated with soda lye until it shows a weakly alkaline reaction and then the clear solution is stirred into the 6-fold quantity of alcohol. The sodium salt of the gold compound which precipitates out is washed with alcohol and, after drying in a vacuum, contains 12-13% of gold.

The sodium salt of the gold compound obtained in this way is yellowish and is readily soluble in water.

Example 16

Four parts by weight of sulphhydryl keratinic acid are dissolved in a 10-fold quantity of water and the solution is acidified with 2 parts by weight of acetic acid. To this solution are added 4 parts by weight of bismuth ammonium citrate dissolved in 20 parts by weight of water. A yellowish product precipitates out. After the reaction mixture has been diluted with water the yellowish product is filtered off at the pump, washed and dried in a vacuum. The compound which is difficultly soluble in water contains on an average 34% bismuth; it dissolves in ammonia, sodium carbonate and sodium bicarbonate with the production of a yellow color. The ammoniacal solutions and the solutions rendered alkaline with soda show a slight sodium nitroprusside reaction.

In place of bismuth ammonium citrate, bismuth tartrate or bismuth nitrate, dissolved in glycerin and water, may also be used.

What we claim is:

1. A method of making compounds containing heavy metals and sulphhydryl groups from keratinates, consisting in hydrolyzing a substance containing keratin with acid until said substance has lost its natural form and become converted into a gelatinous mass, reducing the product with zinc, neutralizing the reduced product until it gives only a slightly acid reaction, separating off the zinc compounds which form, washing the said zinc compounds, decomposing the zinc compounds with hydrogen sulphide, treating the resulting sulphhydryl keratinic acids in aqueous solution with a quantity which is equivalent to the sulphhydryl group content of the solution of a salt of a metal selected from the following group of metals: copper, lead, arsenic, antimony, bismuth, gold, silver, mercury, adding an organic precipitant in order to deposit the metal compound of the sulphhydryl keratinic acids, and separating the deposited compound.

2. A method of making compounds containing arsenic and sulphhydryl groups from keratinates, consisting in hydrolyzing a substance containing keratin with acid until said substance has lost its natural form and become converted into a gelatinous mass, reducing the product with zinc, neutralizing the reduced product until it gives only a slightly acid reaction, separating off the zinc compounds which form, washing the said zinc compounds, decomposing the zinc compounds with hydrogen sulphide, treating the resulting sulphhydryl keratinic acids in aqueous solution with a quantity which is equivalent to the sulphhydryl group content of the solution of an organic compound containing arsenic partly bound to carbon, adding an organic precipitant in order to deposit the metal compounds of the sulphhydryl keratinic acids, and separating the deposited compound.

3. A method of making compounds containing heavy metals and sulphhydryl groups from keratinates, consisting in hydrolyzing a substance containing keratin with acid until said substance has lost its natural form and become converted into a gelatinous mass, reducing the product with zinc, neutralizing the reduced product until it gives only a slightly acid reaction, separating off the zinc compounds which form, washing the said zinc compounds, decomposing the zinc compounds with hydrogen sulphide, treating the resulting sulphhydryl keratinic acids in aqueous solution with a quantity which is equivalent to the sulphhydryl group content of the solution of a salt of a metal selected from the following group of metals: copper, lead, arsenic, antimony, bismuth, gold, silver, mercury, adding alkali until the solution shows a slightly alkaline reaction, adding an organic precipitant in order to deposit the metal compound of the sulphhydryl keratinic acids, and separating the deposited compound.

4. A method of making compounds containing arsenic and sulphhydryl groups from keratinates, consisting in hydrolyzing a substance containing keratin with acid until said substance has lost its natural form and become converted into a gelatinous mass, reducing the product with zinc, neutralizing the reduced product until it gives only a slightly acid reaction, separating off the zinc compounds which form, washing the said zinc compounds, decomposing the zinc compounds with hydrogen sulphide, treating the resulting sulphhydryl keratinic acids in aqueous solution with a quantity which is equivalent to the sulphhydryl group content of the solution of an organic compound containing arsenic partly bound to carbon, adding alkali until the solution shows a slightly alkaline reaction, adding an organic precipitant in order to deposit the metal compound of the sulphhydryl keratinic acids, and separating the deposited compound.

5. A method of making compounds containing gold and sulphhydryl groups from keratinates, consisting in hydrolyzing a substance containing keratin with acid until said substance has lost its natural form and become converted into a gelatinous mass, reducing the product with zinc, neutralizing the reduced product until it gives only a slightly acid reaction, separating off the zinc compounds which form, washing the said zinc compounds, decomposing the zinc compounds with hydrogen sulphide, saturating the aqueous solution of the resulting sulphhydryl keratinic acids with sulphur dioxide, adding to the solution a quantity which is equivalent to the sulphhydryl group content thereof of a gold salt, adding an organic precipitant in order to deposit the gold compound of the sulphhydryl keratinic acids, and separating the deposited compound.

ERNST STURM.
RICHARD FLEISCHMANN.